United States Patent [19]
Kennedy et al.

[11] Patent Number: 5,831,611
[45] Date of Patent: Nov. 3, 1998

[54] APPARATUS AND METHOD FOR CREATING AND EXECUTING GRAPHICALLY DEPICTED COMMUNICATION

[75] Inventors: William Daniel Kennedy, Barrington; Peter Andrew Mueller, Palatine, both of Ill.

[73] Assignee: SalesLogix Corporation, Scottsdale, Ariz.

[21] Appl. No.: 908,280

[22] Filed: Aug. 7, 1997

Related U.S. Application Data

[63] Continuation of Ser. No. 394,030, Feb. 24, 1995, abandoned.

[51] Int. Cl.$^6$ .................................................. C06F 17/30
[52] U.S. Cl. ......................... 345/335; 345/333; 345/967
[58] Field of Search .................................. 345/326, 340, 345/346, 341, 347, 348, 339, 335, 333, 334, 349, 350, 351, 352

[56] References Cited

U.S. PATENT DOCUMENTS

| | | | |
|---|---|---|---|
| 5,414,838 | 5/1995 | Kolton et al. | 395/600 |
| 5,416,895 | 5/1995 | Anderson et al. | 395/148 |
| 5,420,978 | 5/1995 | Tozawa et al. | 395/161 |
| 5,471,575 | 11/1995 | Giansante | 395/144 |

OTHER PUBLICATIONS

"Contact Managers: Keeping In Touch," by Henry Fersko–Weiss, *Byte's Essential Guide to Windows*, Spring 1993, pp. 109–114.

"Work On Your Relationships," by Charles H. Gajeway, *Home Office Computing*, Feb. 1994, pp. 76–81.

"Contact Management," *PC World*, Feb. 1994, p. 180.

"Contact Management—Keeping In Touch," by Kathy Yakal, *Software*, PC Magazine, Aug. 1993, pp. 271–274, 278, 283–285, 290, 292, 295–298, 305, 308–312, 314–315, 318–320, 323–327.

*Lotus Organizer 1.1*, "User's Guide," U.S. 1993.

*Primary Examiner*—Raymond J. Bayerl
*Assistant Examiner*—Steven P. Sax
*Attorney, Agent, or Firm*—Fennemore Craig

[57] ABSTRACT

A process management system is described for creating and executing graphically depicted communication processes. The process management system includes a graphical process editor facilitating the creation of communication processes on a graphical user interface. The graphically depicted communication processes visually represent to a process programmer the relationships between the events comprising the communication process. A process manager executes a set of events comprising both scheduled events and control events corresponding to the graphically displayed events. Furthermore, the process manager may operate in an immediate or real time mode to process the events of the communication process.

15 Claims, 9 Drawing Sheets

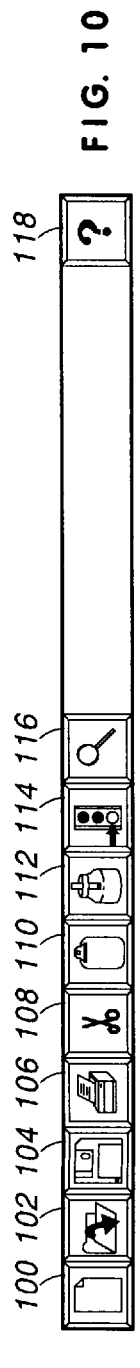
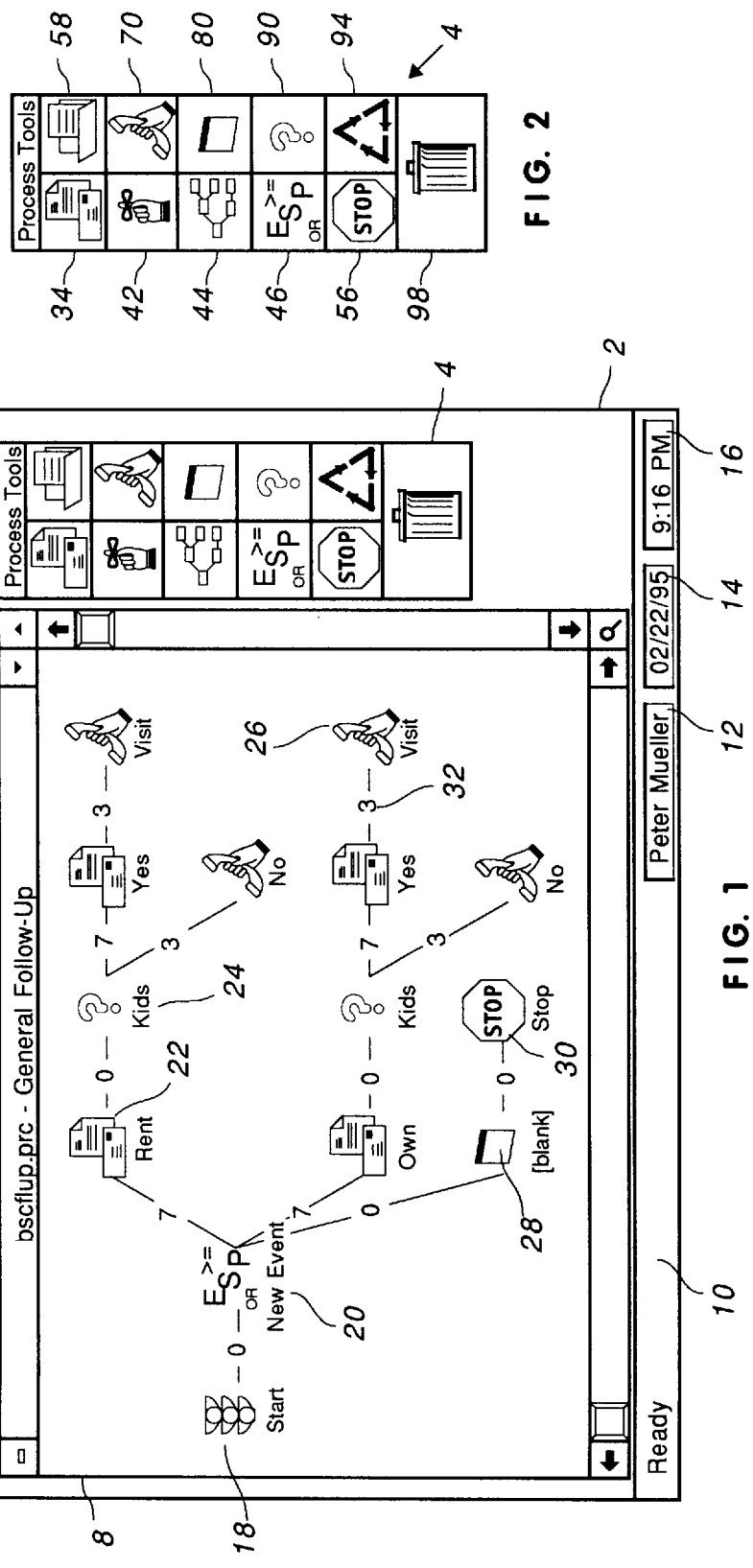

Set ESP Information

| Fields | | |
|---|---|---|
| Last Name | | |
| Address | | |
| City | | |
| State | | |
| Zip Code | | |
| Housing Status | | |
| Age Group | | |
| Subdivision | | |
| Time Frame | | |

48 ↑

= | <> ~52

Rent
50

[ Add ] [ Insert ] [ Update ] [ Delete ]

| Field | Operation | Criteria | And/Or |
|---|---|---|---|
| Housing Status | = | Rent | END |

54

Event: Rent

[✔ Update] [⊘ Cancel]

Stop Process

Action to perform
- ⦿ End this process
- ○ Cancel this process
- ○ Stop process family  [Test ⬇]
- ○ Stop process  [Non Refundable ⬇]
- ○ Stop all processes

[✔ OK] [⊘ Cancel]

FIG. 6

| ICON PROPERTIES | |
|---|---|
| ICON ID. | 150 |
| TAG | 152 |
| TIME | 154 |
| X | 156 |
| Y | 158 |
| CONTROL PROPERTIES | |
| SIZE | 160 |
| ERROR | 162 |
| LINKS | 164 |
| PARENT | 166 |
| NEXT_NODE | 168 |
| EVENT PROPERTIES | |
| QUESTION | 169 |
| ANSWER | 170 |
| ESP | 172 |
| GOTO | 174 |
| EVENT | 176 |
| ENTRY | 178 |

FIG. 11

| | |
|---|---|
| 500 | PROSPECT_ID |
| 502 | PROSPECT_NAME |
| 504 | EVENT_TYPE |
| 506 | RUN_TIME |
| 508 | RUN_DATE |
| 510 | RUN_DURATION |
| 512 | FILE_NAME |
| 514 | COMPLETED |
| 516 | SUMMARY |
| 518 | NOTES |
| 520 | PROCESS_TYPE |
| 522 | PROCESS_NAME |
| 524 | PROCESS_FILE |
| 526 | PROCESS_NODE |
| 528 | USER |
| 530 | RES_INFO |

FIG. 19

| | |
|---|---|
| 220 | VERSION |
| 222 | FIRST_PASS_ARRAY |
| 224 | SECOND_PASS_ARRAY |
| 226 | EMBEDDED FILES |

FIG. 14

| | |
|---|---|
| ID. | 200 |
| NAME | 202 |
| FAMILY | 204 |
| LOCK | 206 |
| FILE | 208 |
| OFFSET | 210 |
| SIZE | 212 |
| FLAGS | 214 |

FIG. 13

| | |
|---|---|
| 180 | TYPE |
| 182 | SUMMARY |
| 184 | NOTES |
| 186 | DESCRIPTION |
| 188 | LEAD_TIME |
| 190 | RES_INFO |
| 192 | DATE / TIME |

FIG. 12

APPARATUS AND METHOD FOR CREATING AND EXECUTING GRAPHICALLY DEPICTED COMMUNICATION

This application is a continuation, of application Ser. No. 08/394,030, filed Feb. 24, 1995, now abandoned.

FIELD OF THE INVENTION

This invention relates to systems for creating and executing processes in a graphical user interface environment, and more particularly to systems for creating and executing business contact communication processes by means of graphical user interface utilities.

BACKGROUND OF THE INVENTION

As virtually any person employed in a service industry will attest, the importance of communication with current, former and future customers, vendors and co-workers (referred to collectively as "contacts") is very important to the success of a business. The vast majority of all businesses need some form of contact management system. Businesses must establish, develop and maintain relationships with customers and vendors. The successful performance of this aspect of running a business often relies upon establishing and then adhering to a set of contact communication protocols.

The vast improvement in both the capability and cost of computer systems in the past decade has resulted in the incorporation of computer technology into the task of communicating with business contacts. More particularly, a number of systems have been developed for maintaining and organizing communications with business contacts. Businesses are now able to keep large amounts of information on business contacts in databases, and the businesses are able to retrieve specific portions of the database according to complex search and sort algorithms.

One category of functionality associated with these computerized business contact management systems is the maintenance of a database for storing and retrieving contact information. The complexity of such databases ranges from Rolodex-type organizers to complex facilities for storing vast amounts of information and retrieving the information by means of complex search and sort utilities. Advanced systems provide users with the ability to structure complex search requests which enable users to identify a specific set of contacts stored in the database and present the set of contacts to the user.

Another category of functionality associated with computerized business contact management systems is the maintenance of an appointment calendar and scheduling future appointments and automatic follow-up reminders. In the known systems, a user enters various scheduled activities in an appointment calendar utility. When a scheduled activity comes due, a reminder is generated by the computer system. Other known systems have advanced job execution capabilities such as automatically executing scheduled activities, generating letters and sending faxes or other correspondence based upon a script of scheduled events.

The above described known systems for scheduling and actually executing business communication activities offer significant advantages over the previous methods for maintaining files on contacts and scheduling activities via "todo" lists and appointment books. However, these new computerized systems are still time consuming in terms of the scheduling of activities. Furthermore, the prior known systems do not provide for any easy means for implementing new contact management policies and protocols or for modifying existing protocols. Nor did these prior systems provide programming tools which enable businesses to quickly and easily develop contact communication protocols which are then applied generally to a database of business contacts. As a result, despite the attractiveness of the known contact managers, the actual use of these systems for implementing a structured communication scheme was limited by the difficulty of learning and/or using the systems.

SUMMARY OF THE INVENTION

In view of the foregoing, it is a general aim of the present invention to provide an improved business communications management system for easily developing and implementing communication protocols.

A general object of the present invention is to provide a communications management system which automatically applies a communication protocol to a set of database entries representing a wide and diverse variety of business contacts in order to generate and execute a set of scheduled events.

It is another object of the present invention to visually depict the flow paths of a process manager through a complex communication process comprising a large number of events in order to more effectively show to a communication process programmer the logical relationships of the various events comprising the communication process.

The above and other objects are fulfilled in a process management system for creating and executing communication processes for scheduling and maintaining correspondence with business contacts. The process management system comprises a process editor which facilitates the creation by a communication process programmer a graphically depicted communication process. The graphically depicted communication process comprises a set of graphically depicted events arranged upon a graphical user interface and graphical relation indicators for visually depicting the relationships between the graphically depicted events.

The process management system also includes a process manager for executing a set of events corresponding to the graphically depicted events. More specifically, the set of events comprises scheduled communication events associated with interpersonal communications and control events for conditionally directing execution of the set of events by the process management system.

The above described process management system provides substantial assistance to a person involved in any business where it is necessary to contact potential customers and to follow up on initial contacts on a well scheduled basis. Furthermore, the editing tools described above make designing a communication strategy with the potential customer virtually effortless. The simple programming procedures and enhanced visual feedback provided by the graphically depicted processes ensure that virtually anyone can program and use the process management system to custom design and implement an automated business contact communication protocol.

BRIEF DESCRIPTION OF THE DRAWINGS

FIG. 1 is an illustrative depiction of the main graphical user interface for a process editor in a process management system incorporating the present invention;

FIG. 2 is an illustrative depiction of a task pallet from which events are selected during programming of graphically depicted processes in accordance with the present invention;

FIG. 5 is an illustrative depiction of an ESP dialog box associated with the programming of an ESP event;

FIG. 6 is an illustrative depiction of a Stop dialog box associated with the programming of a Stop event;

FIG. 10 is an illustrative depiction of a toolbar from which a programmer invokes various utilities provided by the process editor;

FIG. 11 is a schematic illustration of the fields of a data structure for an event within a graphically depicted communication process;

FIG. 12 is a schematic illustration of the sub-fields of the Event field in the event data structure of FIG. 11;

FIG. 13 is a schematic illustration of the sub-fields of the Entry field in the event data structure of FIG. 11;

FIG. 14 is a schematic illustration of the fields of a stored graphically depicted communication process;

FIG. 19 is a data structure for a single executed event in a graphically depicted communication process.

DETAILED DESCRIPTION OF A PREFERRED EMBODIMENT

Figure 3:
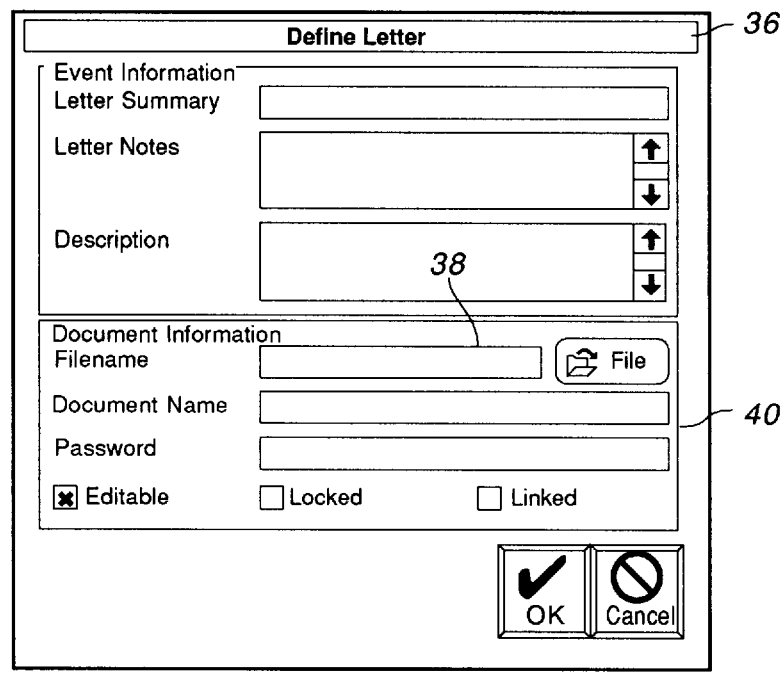
FIG. 3 is an illustrative depiction of a Letter dialog box associated with the programming of a Letter event.

While the invention will be described in connection with a preferred embodiment, there is no intent to limit it to the preferred embodiment. On the contrary, the intent is to cover all alternatives, modifications and equivalents falling within the spirit and scope of the invention as defined by the appended claims.

Turning now to FIG. 1, the primary process editing interface is depicted for a process management system embodying the present invention. A process editor window 2 comprises the primary editing interface of the process management system. The process editor window 2 includes an event pallet 4. The process editor window 2 also includes a tool bar 6. In addition, the process editor window 2 includes an edit window 8. Finally, the process editor window 2 includes a status bar 10. The status bar 10 in turn includes a Current User field 12, a Current Date field 14, and a Present Time field 16. While the primary sections of the process editor window 2 have been described, it will be understood that in other embodiments of the present invention the above-described components can be modified and/or removed.

In accordance with one aspect of the present invention, the relationships between the various conditionally executed events are graphically represented to a programmer of the communication process while the programmer is creating or modifying the communication process. It is noted that the events and their relationships are illustrated during the editing of the graphically depicted communication process. While not precluded in alternative embodiments of the present invention, the event icons for a graphically depicted communication process and the lines connecting the event icons are not displayed upon the graphical user interface when the process is executed by the process manager.

Furthermore, the events which make up the graphically depicted communication process comprise not only scheduled events, but also include control events. Control events define the flow of execution of the process manager a process through the events graphically represented on the graphical user interface. Scheduled events are characterized by an activity which is performed (as opposed to a condition tested). After the process manager of the process management system executes a graphically depicted process, records corresponding to each of the executed events are stored in a database. Executed scheduled events are registered in an appointment calendar for the user.

An illustrative example of a graphically depicted communication process is provided in the edit window 8 in FIG. 1. A Start icon 18 graphically depicts the starting point of the graphically depicted communication process comprising a set of events. In the illustrative example of a graphically depicted communication process, the start icon 18 is followed by an Event Selection Procedures (ESP) icon 20 graphically depicting an ESP event. Event selection procedures associated with the ESP icon 20 conditionally direct the flow of execution by the process manager to one of the attached child events of the ESP event to which the ESP icon 20 is associated. This is represented graphically in the edit window 8 by the branching of the communication process at the ESP icon 20 into three conditionally followed paths.

The programmer of the graphically depicted communication process attaches events to the ESP icon 20. For each attached event, the programmer is prompted by the process editor to enter, via an ESP dialog box (described below), a separate criterion for each attached event under which execution of the communication process will branch to the attached event. In the illustrative example of the present invention, when a first criterion associated with one of the set of attached events is met, then any remaining branches are disregarded. However, in alternative embodiments of the invention, all attached events are tested and executed if their criteria are met.

A Letter icon 22 associated with a letter event branches from the ESP icon 20. The Letter icon 22 is associated with an embedded letter which is to be mailed to a customer when the criterion for the letter event is met during processing of the ESP event with which the ESP icon 20 is associated. The embedded letter can be specified by a link to the letter event, or alternatively, the letter can be embedded in full within an event data structure associated with the letter event.

The Letter icon 22 is followed in the graphically depicted process by a Question icon 24 provided in conjunction with a question event. After specifying a question for the question event, a programmer of the graphically depicted process attaches child events onto the question event. When a child event is attached to the question event by a communication process programmer, the process editor generates a dialog box prompting the programmer to specify a short answer for which process execution will proceed to the child event.

Question events are associated with a question dialog box which pops up when the question event is executed by the process manager during the running of the communication process or at a specified later date. After the question dialog box associated with a question icon appears, the user of the process management system is presented the question and prompted to select one of the short answers associated with the attached events. Subsequent execution of one of the branches from the question event in the communication process is based upon the response provided by the user.

Yet another type of icon included in the illustrative example of a graphically depicted process is a Phone call icon 26 which graphically illustrates a phone call event in a communication process created by a programmer. The Phone call icon 26 is associated with a scheduled phone call event to a business prospect. The process manager executes a communication process in either immediate mode or real time mode. Executing a graphically depicted communication process in the immediate and real time modes are discussed below in connection with a description of FIGS. 17 and 18. When the process manager operating in real time mode executes the phone call event associated with the Phone call icon 26, prospect information is displayed. After completion of the phone call, status information is recorded identifying whether the call was completed, busy, message was left, or there was no answer. If a call is not completed, then the user is provided the option to reschedule the call. If however, the process manager is operating in immediate mode, then the phone call is scheduled into the appointment book for the user.

Continuing with the description of the graphically depicted communication process illustrated in FIG. 1, a Dialog box icon 28 is attached as a child of the ESP icon 20. The Dialog box icon 28 is associated with a dialog box event. When the process manager executes the dialog box event in response to certain detected conditions specified by the dialog box event, a dialog window is generated. The dialog window provides the user with a message inserted by the communication process programmer. A user dismisses the dialog box by clicking on one of the command buttons provided in the dialog window. Further communication process events may be executed conditionally based upon the user's selection from the plurality of command buttons. The editing and function of the dialog box are described in greater detail below.

The final type of icon represented in the illustrative example in FIG. 1, is the Stop icon 30. The Stop icon 30 is associated with the ending of the execution of a communication process or set of communication processes currently being executed by the process manager. When the stop icon is executed, one or more processes are stopped or canceled depending upon which stop option is selected by the programmer of the graphically depicted communication process. Five "stop" options available to the communication process programmer are described below in conjunction with FIG. 6.

In accordance with the illustrative example of the present invention, each event is separated from a previous event in a communication process by a designated time lapse. In the illustrative example of the present invention, the time lapse between a parent and a child event is graphically depicted by a time lapse indicator such as the Time Lapse Indicator 32 having a value of "3". The Time Lapse Indicator 32 specifies the time, in days, that will pass between the scheduled execution of a parent event (a letter event) and a child event (a phone call event) for which the time lapse is specified. In the case where processing the child event is conditioned upon the completion of the parent event, the child event may be delayed beyond the time lapse period specified by the time lapse indicator 32 until the parent event is completed.

While the current example specifies time lapses in days, in other embodiments of the present invention, events in a communication process may be separated by hours or even minutes. It is also noted that in yet other alternative embodiments, the time lapse indicator is replaced by a triggering event such as an exact execution date. In such an alternative embodiment, an event with which an event icon is associated is not executed by the process manager until the triggering event has taken place.

Turning now to FIG. 2, the event pallet 4 is depicted. The event pallet 4 provides easy access to the set of events which are used by the communication process programmer to construct or edit a graphically depicted communication process via drag and drop operations. When a communication process programmer clicks upon one of the graphical event squares of the event pallet 4, the process editor retrieves an icon corresponding to the selected event type to be added to the graphically depicted communication process currently displayed in the edit window 8. After the programmer places the icon in a selected portion of the graphically depicted process, the process editor provides a dialog box (if one is associated with the selected event type) prompting the programmer to enter specific information associated with the event added to the graphically depicted communication process. This portion of the process programming procedure is discussed in greater detail below in conjunction with each of the event squares on the event pallet 4. It is noted that the events displayed in the event pallet 4 is not a closed set. On the contrary, communications process programmers are provided a template for adding additional defined event types to the event pallet. These added processes are identified during start-up of the process editor and there associated event squares are added to the extensible event pallet 4.

The event pallet 4 includes a Letter Event square 34 for creating a letter event to add to a graphically depicted communication process. Turning briefly to FIG. 3, the dialog box associated with the Letter Event square 34 is depicted. A title bar 36 identifies to the programmer that the dialog box is associated with a letter event. A Letter Summary field in the letter dialog box enables a programmer to insert a short string of text identifying the letter event. The Summary Field text is displayed in an appointment book containing a list of scheduled events for a user. A Letter Notes field in the letter dialog box enables the programmer to enter any notes associated with a particular programmed letter event. The text of the Letter Notes field is available for review and editing by a user of the communication process. A Description field enables the programmer of the letter event to provide additional text concerning the content of the letter which is only available to the programmer. A File Name field 38 specifies a storage location of a letter file associated with the letter event. Selecting the "File . . . " button opens the letter file. In addition, a Document field identifies the actual letter document within the designated file.

An advanced information area 40 enables a user to designate special information associated with the letter event such as the setting of control flags specifying whether the letter document will be editable, locked (cannot be accessed by a user), and whether the letter document is linked to, or actually embedded within, the Letter event data structure. A password field enables a programmer to designate a password that will allow access by a user to a locked letter document.

Figure 4:
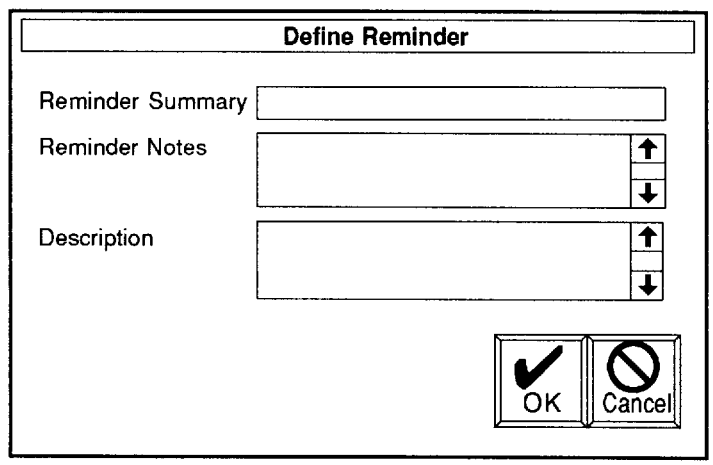
FIG. 4 is an illustrative depiction of a Reminder dialog box associated with the programming of a Reminder event.

The event pallet 4 includes a Reminder Event square 42 for creating Reminder events. A Reminder event notifies a user of tasks and appointments which the user is to complete. When the Reminder Event square 42 is selected by a communication process programmer, the process editor creates a reminder icon. After the programmer drops the reminder icon on a parent event icon in a graphically represented process, a Reminder dialog box is generated. Turning to FIG. 4, the Reminder dialog box is depicted. A title bar indicates to the user that the dialog box is a Reminder dialog box. The Reminder dialog box includes a reminder summary field, a reminder notes field, and a description field. These fields are modified by the programmer or a user in accordance with the particular subject matter of the reminder. These fields correspond functionally to the summary, notes, and description fields described above for a Letter event described above in connection with FIG. 3.

Next, a Sub-process Event square 44 is selected by a user in order to create an event linking a separately defined and stored process to the current graphically depicted communication process. Sub-process events provide a convenient and efficient way to define graphically depicted processes since sub-processes facilitate modular programming of the graphically depicted processes. After defining the modules, the modules are joined in accordance with the particular needs of a programmer using Sub-process events.

The dialog box associated with a sub-process event is substantially the same as the dialog box for a Letter event depicted in FIG. 3. However, the summary and notes fields of the sub-process dialog box, while performing the same functions as the corresponding fields in a Letter event, are identified as Sub-process Summary and Sub-process notes respectively. The Filename field specifies the file containing the sub-process which is linked to the currently loaded graphically depicted communication process via the sub-process event.

Continuing with the description of FIG. 2, an ESP event square 46, when selected by a programmer, results in the providing of an ESP icon which is dragged and dropped by a user onto a parent event in the graphically depicted communication process. A dialog box associated with the ESP event is not generated until a programmer drags and drops a child event icon onto the ESP event.

Turning briefly to FIG. 5, a dialog box associated with the dropping of a child event upon an ESP event is depicted. The ESP dialog box includes a Field list 48 which specifies possible fields within data base entries which may be queried by the process manager when an ESP event is executed by the process manager upon a selected prospect record. In the example provided in FIG. 5, the housing status field has been selected by a programmer. The ESP dialog box also includes a criteria field 50 which offers a programmer a choice of possible selections the selected field type. In the illustrated example, the criteria is "rent" for the selected field, "housing status". In addition, the operator buttons 52 specify whether the relationship is to be an equality relationship, not-equal, a less than, or a greater than relationship. Other logical relationships for defining an event selection criteria will be known to those skilled in the art and systems incorporating such alternative logical relationships would fall within the intended scope of the present invention.

The conditions for passing to the attached child event are summarized in a criteria list field 54. In the illustrative example of FIG. 5, the housing status field has been selected, the operation is equality, and the criteria is rent. Since there are no other conjunctive or disjunctive conditions, an end designation is inserted in the and/or field. Therefore, in order to for the process manager to execute the child event having the selection criterion summarized in FIG. 5, the housing status of the selected prospect (to which the process manager applies the ESP event) must equal "rent". In other examples, however, this condition can be coupled with others by inserting additional field operation and criteria information and linking the condition designating a disjunctive or conjunctive relationship between the conditions in the and/or portion of the criteria list field 54.

Returning to FIG. 2, a Stop Event square 56 is associated with a Stop event procedure for stopping or cancelling a process or set of processes. FIG. 6 shows the dialog box associated with the selection of the Stop Event square 56. The dialog box for a Stop Event presents the programmer with five stop options. The "End This Process" option causes the termination of the process in a manner identical to the process manager reaching the last event on a communication process. The "Cancel This Process" option not only halts execution of a process, but also does not save any records created previously by the process manager when executing previous events in the communication process. The "Stop Process Family" option terminates (without delete existing records) a set of currently running processes under a same process family. The "Stop Process" option terminates (without deleting existing records) a specified process. Finally, a "Stop all processes" option terminates (without deleting existing records) all communication processes running under the current user.

The event pallet 4 in the illustrative process management system incorporating the present invention is extensible. In other words, the set of events displayed on the event pallet 4 can be modified by specifying plug-in events according to an event definition template. The template includes such information as displayed icon for the event, event properties, and any associated dialog boxes for the defined plug-in event. The event definition is placed in a start-up directory containing all of the event definitions to be displayed upon the event pallet 4. If an event definition specifies new event properties, these new properties are stored as addition fields in the Event Properties portion of the event data structure shown in FIG. 11.

Returning to FIG. 2, one such plug-in event is a Form event. A Form Event square 58, when selected by a programmer, results in the providing of a Form icon and the generation of a Form dialog box. A Form Event enables a user to enter data for a particular prospect, and store that data in a database. The Form Event prompts a programmer to enter the file and document name of a form and to enter a summary, notes and description into fields similar to the Letter Dialog box shown in FIG. 3.

Other examples of plug-in events include an Email event and a DDE link event. An Email event is similar to a Letter event. However, instead of printing, a document is transferred via email to the intended receiver. A DDE link event allows a graphically depicted process to submit commands to other programs via well known DDE command submission procedures. The general format of the dialog boxes presented by the process editor to a communication process programmer is similar to the Letter dialog box.

A Phone Call Event square 70 is also provided on the event pallet 4. The phone call square 70 is associated with a phone call icon. When a graphically depicted process programmer selects the phone call event square 70, a phone call dialog box is generated by the process manager editor. The dialog box for the phone call event square 70 is substantially the same as the dialog box associated with the programming of a reminder and is therefore not provided in the figures. The title bar is modified in the dialog box illustrated in FIG. 4 to indicate that a phone call event is being programmed. The phone call dialog box includes the same summary, notes and description fields previously described in connection with the Letter Event.

Figure 7:
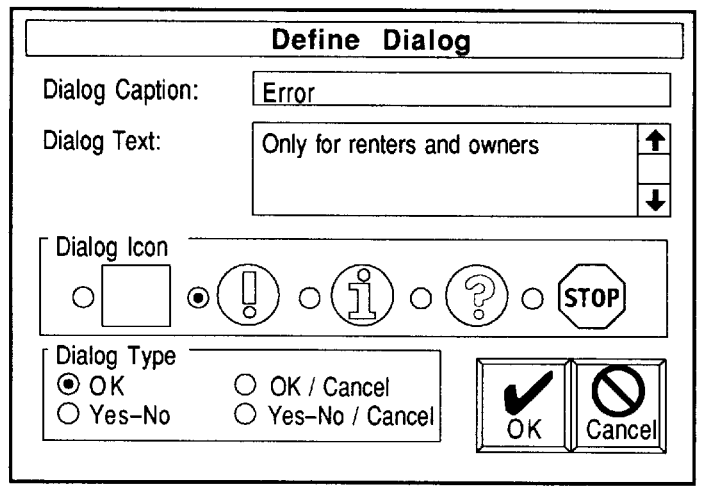
FIG. 7 is an illustrative depiction of a dialog box associated with the programming of a Dialog box event.

Continuing with FIG. 2, when a programmer selects a Dialog Event square 80, a Dialog Box icon such as icon 28 in FIG. 1 is generated. When the programmer drops the dialog box icon on a graphically depicted process, a dialog box of the type depicted in FIG. 7 is generated by the process manager editor. The dialog box includes a dialog caption field which enables the programmer to enter text which is in turn used during the execution of the graphically depicted process to fill in the title bar of the dialog box. The dialog box also includes a dialog text field. When the dialog box event is encountered during the execution of a graphically depicted process, the contents of the dialog text field are displayed within the dialog box presented to the user in order to provide useful information enabling the user to select a proper course of action. The dialog box also includes a dialog icon field containing five options for icons which will be inserted into the dialog box. The dialog box illustrated in FIG. 7 also includes a dialog type field. The dialog type field enables the programmer to select the button type that will be presented to the user when the dialog box event is executed by the process manager. The choices are OK, OK/Cancel, Yes/No, and Yes-No/Cancel.

Figure 8A:
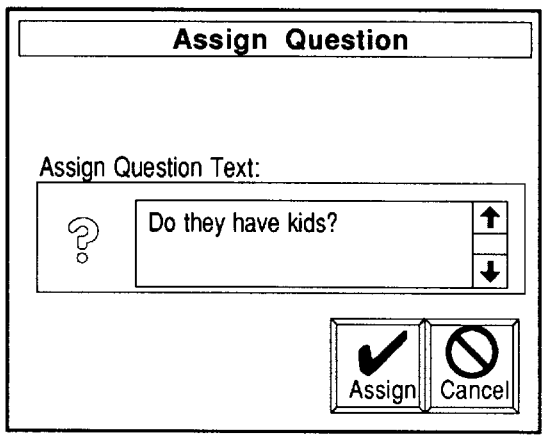
FIGS. 8a and 8b illustratively depict the Question and Answer dialog boxes associated with the programming of a Question event.
Figure 8B:
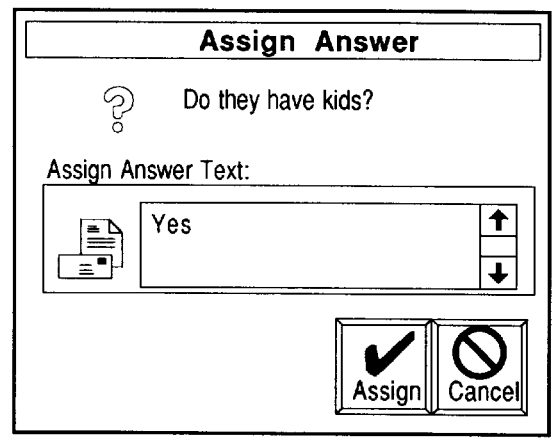

Returning to FIG. 2, the event pallet 4 includes a Question event square 90. Turning briefly to FIGS. 8*a* and 8*b*, the dialog boxes associated with the selection of the question event square 90 are depicted. The Assign Question box illustratively depicted in FIG. 8*a* includes a field for inserting text which will be presented to a user of the graphically depicted process during execution of the question event. The Assign Question box is generated when a programmer drops the Question icon on a parent event.

The assign answer box illustrated in FIG. 8*b* is generated whenever a programmer attempts to attach a child event to a question event by dropping the child event upon the question event. The dialog box illustratively depicted in FIG. 8*b* prompts the programmer of the graphically depicted process to provide an answer to the question specified in the question event which will result in the execution of the child event. In the illustrated example of FIGS. 8*a* and 8*b*, the question asked in the Assign Question dialog box 8*a* is "Do they have kids?" The Assign Answer dialog box of FIG. 8*b*, associated with a child Letter event, indicates that if the answer is "yes," then a letter is to be generated in accordance with information specified by the child Letter event.

Figures 9, 16:
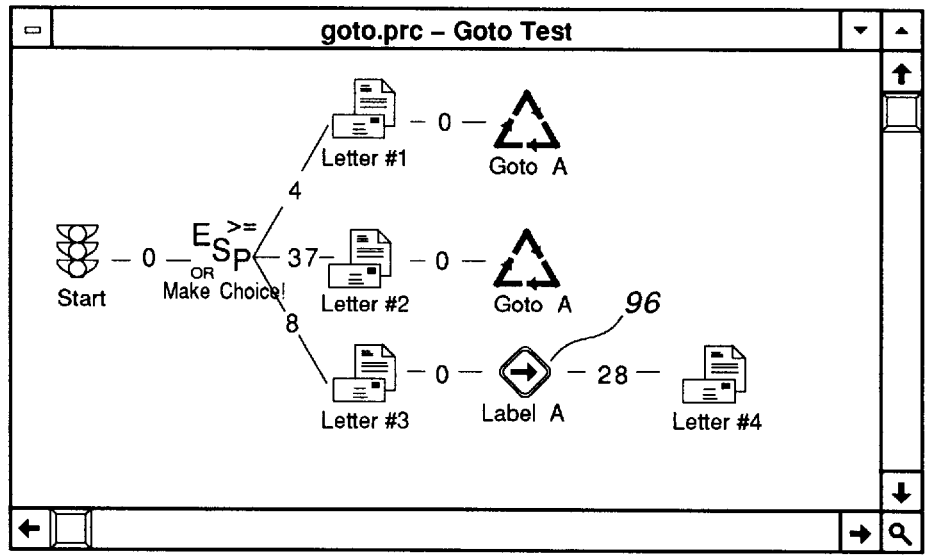
FIG. 9 is an illustrative depiction of a graphically depicted communication process including Goto events enabling process flow to jump from a first point to a second point in the graphically depicted communication process.
FIG. 16 is a schematic illustration of a Run Process dialog box associated with the selection of a pre-defined communication process, selection of one or more prospect records, and viewing of scheduled events resulting from execution of a selected communication process upon a selected prospect record.

Returning to FIG. 2, a Goto event square 94 is displayed within the event pallet 4. When a communication process programmer selects the Goto event square 94, the process editor provides a jump destination icon designating the point in the graphically depicted communication process to which the process flow will jump. The programmer sets the jump destination by moving the destination icon to the point in the graphically depicted communication process to which the process manager will jump when the Goto event is executed. The links of the graphically depicted process are automatically updated by the process editor. Turning briefly to FIG. 9, when execution of the graphically depicted communication process reaches one of the Goto events, process execution jumps to the jump destination 96.

The above described events provide substantial assistance to businesses which must frequently and regularly correspond with contacts and follow up on initial correspondence and meetings on a well scheduled basis. Furthermore, the editing tools described above make designing a communication strategy with contacts virtually effortless. The simple programming procedures and enhanced visual feedback provided by the graphically depicted processes ensure that virtually anyone can program and use the process management system to custom design and implement an automated client/contact communication protocol.

Returning again to FIG. 2, the event pallet 4 includes a garbage can region 98. The garbage can region enables a user to delete graphically depicted events from graphically depicted processes by dragging and dropping a corresponding icon to the garbage can region 98. When an event is removed from a process, all descendants of the removed process are also removed from the graphically depicted process unless the removed event has only one descendant. In that case, the single descendant is automatically reattached by the process editor to the parent event of the removed event.

Turning now to FIG. 10, the fields of the toolbar 6 are illustrated. When a programmer selects a new button 100, a new process is created. When the programmer selects button 102, the process editor receives an open command. Thereafter, a dialog box associated with previously stored graphically depicted communication processes is displayed in the graphical user interface. The programmer thereafter selects one of the listed processes.

When a programmer selects a save button 104, the graphically depicted process currently displayed in the edit window 8 is saved to a specified file in a known manner. When a programmer selects button 106, a print dialog box is generated prompting a programmer in a known manner to select a file or portion of a file to be printed. Buttons 108, 110, and 112 are associated with the well-known cut, copy and paste commands, respectively.

When a programmer selects the test button 114, the process management system traces through the currently displayed graphically depicted communication process and identifies any logical errors or incomplete event specifications existing in the current displayed graphically depicted communication process. The tool bar 6 also includes a zoom button 116. The zoom button 116 is associated with a well known procedure for displaying a graphically displayed communication process at various scales. Finally, the tool bar 6 includes a help button 118 for providing information for the various elements of the process manager system.

Having described the graphical user interface of the process editor for the process management system, attention is now directed to the data structures associated with the events and processes associated with the process management system. Turning to FIG. 11, the fields for an event data structure are schematically illustrated. The first section of fields comprise a set of Icon Properties. The icon properties define the appearance of the icon associated with an event in the Edit window 8. An Icon ID field 150 comprises an integer value identifying the particular icon on the Edit window 8 with which this event is associated. A Tag field 152 comprises a text string corresponding to the text displayed below the icon on the graphical user interface. An example of the contents of the Tag field 152 is the word "rent" associated with the Letter icon 22 in FIG. 1. A Time field 154 comprises an integer identifying the time lapse between execution of the event and a parent event for the event. The X field 156 and the Y field 158 comprise integers which indicate the X and the Y position of the icon within the Edit window 8.

The next set of fields for each event comprise the Control Properties for the event. The Size field 160 specifies the size of the event data structure. The Error field 162 comprises a set of bits identifying particular errors encountered by the process management system during a test of the graphically represented communication process initiated by a process programmer by selecting the test button 114 of the tool bar 6 illustrated in FIG. 10. A Links field 164 specifies the number of child events branching from the event. A Parent field 166 comprises an integer identifying the event ID of the event's parent event. A next node field 168 comprises an array of integers specifying the child events associated with the event. In alternative embodiments of the invention, parent and child events may be specified by pointers instead of identification values.

Each event also includes a set of Event Properties. The set of Event properties is extensible. Therefore the set of fields in the event properties field may be expanded to include special properties associated with previously defined "plug-in" event types. A portion of the event properties specified in the event data structure are used only for specific event types. For example, a Question field 169 comprises a string of text which is presented to a user during execution of a Question event. An Answer field 170 comprises a text string or dialog button (stored in a child event of a Question event) specifying an answer which will lead to the execution of a child event.

Another field which is specific to a particular event type is the ESP field 172. The ESP field 172 contains a structured query language (SQL) statement corresponding to a search criteria specified by an ESP event. A Goto field 174 is specifically used in conjunction with the Goto event type. The Goto field 174 specifies an index value for an event to which process execution is to proceed. The event properties also include an Event field 176. The Event field 176 comprises a number of sub-fields which are described hereinbelow in conjunction with FIG. 12. The event properties also include an Entry field 178. The Entry field 178 also comprises a set of sub-fields which are described hereinbelow in conjunction with FIG. 13.

Turning now to FIG. 12, the sub-fields of the Event field 176 are schematically depicted. A Type field 180 identifies the event type for the event. The various event types have been described previously in conjunction with FIGS. 1 and 2 of the illustrative embodiment of the present invention. It will be understood, however, that in alternative embodiments of this invention, the set of event types are modified in accordance with other communication tasks and/or conditions for execution of the communication tasks. Next, a Summary field 182, a Notes field 184, and a Description field 186 comprise strings of text corresponding to the programmer specified text entered in the summary, notes, and description fields contained in, for example, a Letter event, a Sub-process event, and a Form event. The dialog box for prompting a programmer to enter this information is illustratively depicted in FIG. 3. A Leadtime field 188 specifies a lead time. The lead time is the number of days/hours/minutes before the occurrence of the event, that the event will be presented to the user. For example, if the lead time on a reminder is 5 minutes, then the computer will pop up a dialog box informing the user that the user has a remind event approaching. This is a handy event for reminding the user of appointments.

Figure 18:
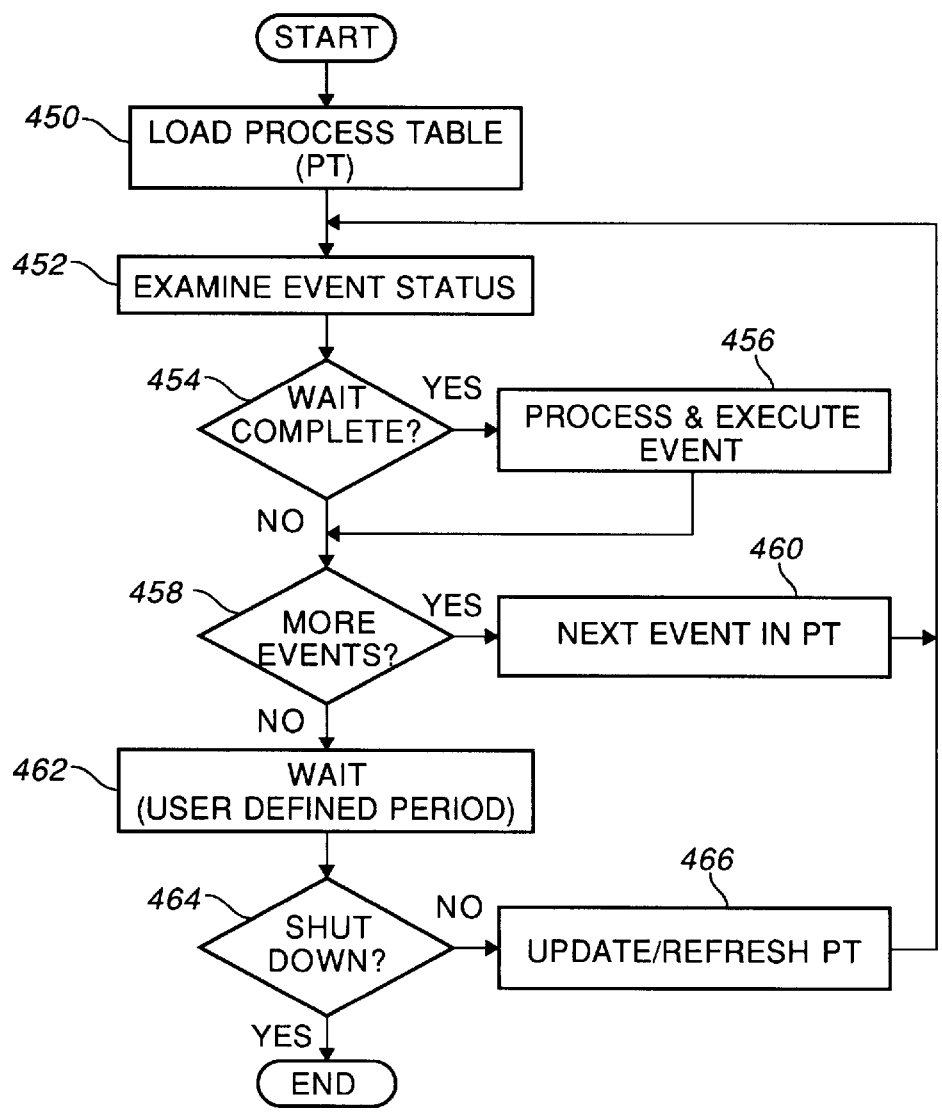
FIG. 18, a flowchart summarizing the steps executed by a process manager when a graphically depicted communication process is executed in real time mode; shows the steps for executing a communication process in the real time mode.

The event field 176 also includes a ResInfo field 190. The ResInfo field 192 is a miscellaneous storage region for event data which cannot be stored in the above-described fields of an event. It is envisioned that programmers will design their own custom events to augment the supplied events. Event specific information associated with the programmer designed custom events may be stored in the ResInfo field 190. When an event is executed and a record of the type shown in FIG. 18 is generated, the contents of the ResInfo field 190 are stored in the record.

A date/time field 192 specifies an exact time/date for execution of an event. When the date/time field 192 equals zero, then the process manager uses the time lapse specified for an event to schedule the execution of the event.

Turning now to FIG. 13, the sub-fields are schematically illustrated for the Entry field 178 of the event data structure. The sub-fields of the Entry field 178 identify and describe a file linked to the event. An ID field 200 contains an index value identifying the file in the event's embedded file table. A Name field 202 comprises a string of text identifying the document. A Family field 204 is a string of text identifying a category to which the document is associated.

A Lock field 206 is a string of characters comprising a password. Which is used in conjunction with a Lock bit in the Flags field 214. The password is intended to prevent unauthorized review of the linked file by others. A File field 208 comprises a string of text comprising a file name which matches the name of the linked file stored on a hard disk drive or other suitable secondary memory device. An Offset field 210 comprises a number identifying the offset of the file data from the start of the embedded file. A Size field 210 specifies the size of the file data in the identified file. The Offset field 210 and the size field 212 are only used in the case where the actual file is embedded within the event data structure. In cases where the file is specified by a link, the offset field 210 and the size field 212 are not used.

The Entry field 178 also includes a Flags field 214 specifying status information about the embedded file. The Flags field 214 specifies whether the embedded file may be edited by a user, whether the file is locked (and therefore cannot be reviewed by a user), whether the event is required (i.e., must be completed), and whether the file is linked rather than actually embedded within the event. The set of flags described above is not all inclusive. It will be appreciated by those skilled in the art that additional flags can be provided for controlling the use of the associated file.

As noted above, an embedded file may be stored in one of two ways. The file may be linked into the event by including the file name in the file name box for the event. This option provides quick changing of a file. However, this may cause errors if the file is moved or deleted from the hard drive. The second way to embed a file is to copy the file directly into the event data structure.

Having described the data structure for an event, attention is now directed to FIG. 14 wherein the general data structure for a communication process, comprising a set of linked events, is schematically depicted. The first field of the data structure storing the graphically depicted communication process is a version identification field 220. The version identification field 220 identifies the version of the process editor which saved the particular communication process file.

A First Pass array 222 contains the Entry field 178 of each event having a designated file. (Events which do not designate a file do not have any information in their entry field 178.) In addition to the Entry field 178 for each event designating a file, the First Pass array 222 contains in the first array position, a data structure for the file storing the communication process having the same structure as the Entry field (schematically depicted in FIG. 13).

A Second Pass array contains all of the rest of the fields other than the Entry field 178 for all events in a communication process. The first position of the Second Pass array 222 specifies the number of events (nodes) which are contained in the graphically depicted communication process. The event data structures may be incomplete since the event data structures in the second pass node array 222 do not include any embedded (not linked) files which are to be inserted within the event data structures.

Finally, an Embedded Files array 226 comprises the actual embedded files which are designated by events in a communication process that are not linked to the events. When the actual embedded files are loaded into the Embedded Files array 226, the offset and size fields 208 and 210 of the corresponding event data structures are updated to account for the embedded files.

Figure 15:
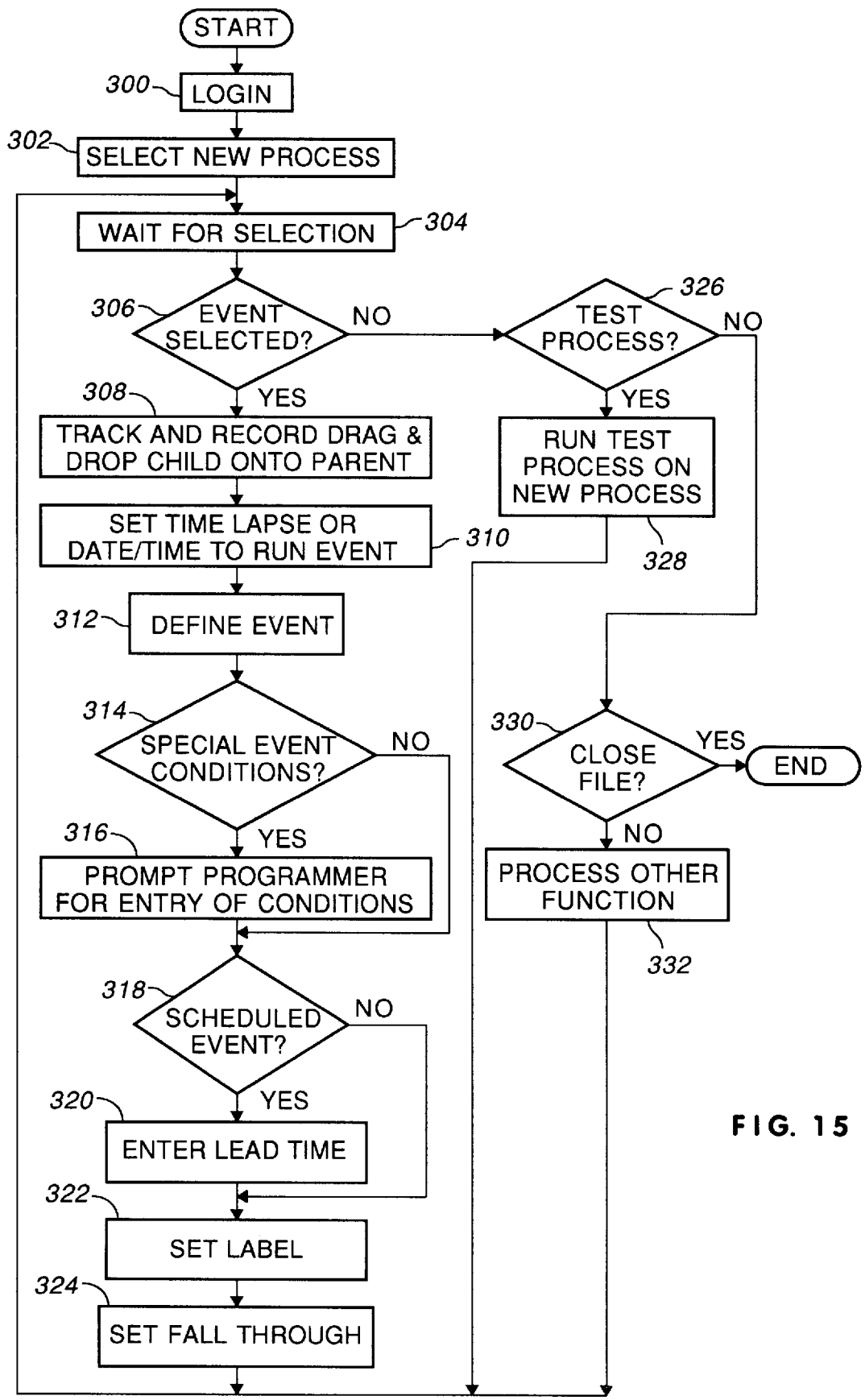
FIG. 15 is a flowchart summarizing the steps executed by the process editor when a programmer is creating a graphically depicted communication process.

Having described the data structures for an event and for a process (comprising a set of events), attention is now directed to FIG. 15 wherein the steps for creating a graphically depicted communication process are described. From the Start, control passes to the login step 300. In the illustrative example of the present invention, the process management system initially presents a login dialog box to the programmer. The programmer enters a name and password into appropriate fields. The process management system compares the name and password to a set of authorized users. After verifying that the name and password correspond to an authorized user, thereafter, the programmer selects an edit option to activate the process editor and control passes to step 302.

In order to create a new process, at step 302 the programmer selects the New Process icon 100 on the tool bar 6. Alternatively, the programmer can click on the "New . . . " option from the "File" menu. When the user selects the New Process option, the process editor creates and places a Start icon such as Start icon 18 in the Edit Window 8. The Start icon is the graphical representation of the beginning of a process. The Start icon has no properties.

Control then passes to step 304 wherein a loop for defining the events of a process is entered. At step 304, the process editor waits for the communication process programmer to select one of the available process editor options on the process editor graphical user interface illustratively depicted in FIG. 1. These options include File options, event selections from the event pallet 4, existing graphically depicted events and the tool bar options.

Continuing with the description of FIG. 15, when a programmer makes a selection, control passes to step 306 and the process editor determines whether the process programmer has selected an event square from the event pallet 4. If the programmer has selected one of the event squares on the event pallet 4, then control passes to step 308 wherein the process editor tracks the dragging and dropping of an icon corresponding to a selected event from the event pallet 4 onto a parent event icon in the edit window 8. In the case of the first selected event, the only available parent event icon is the Start icon.

When the programmer drops the selected event icon onto a parent event icon, the process editor updates the data structures of the parent event and the newly added child event to reflect the logical relationship between the two events. In particular, the parent field 166 in the newly added event data structure is updated to identify the parent event. The links field 164 and the next node field 168 are updated in the parent event data structure in order to identify the logical link of the parent event to the newly added event in the graphically depicted communication process. It is also possible for a programmer to insert an event between two existing linked events. The link and parent information in the affected events updated in a straight-forward manner. Also, the position fields for any displaced child events are also updated.

In addition, the process editor automatically positions the icon for the newly added event at a location on the display screen to the right of the parent event. Furthermore, a line is drawn on the display screen identifying the connection between the parent event and the newly added child event. Control then passes to step 310.

At step 310, the programmer sets the time lapse between the parent and child events. In an alternative embodiment of the present invention, the time lapse designation may be replaced by a condition for triggering the execution of the child event (such as an actual date and/or time when the child event should be executed). After a time lapse is set by the programmer, the time lapse is represented graphically upon the screen as a number inserted on the line between the parent and newly added child event. An example of the graphically represented time lapse is the time lapse 32 having a value of "3" in FIG. 1. A process programmer can modify a time lapse by clicking upon the time lapse displayed on the graphical user interface. A dialog box is generated by the process editor prompting the programmer to enter a new time lapse value.

Next, at step 312, the programmer is prompted by the process editor to define certain fields for the newly added event. The defining of an event is specialized to each of the various types of events represented on the task pallet 4. The defining of the event is facilitated by the process editor generating dialog boxes (if needed) of the type illustrated in FIGS. 3–9 which are described above.

If at step 312 the new event is a Letter event or a Form event, then a dialog box of the type illustrated in FIG. 3 is displayed. In addition, the programmer will also select certain document options displayed in the advanced information area 40. These options correspond to the various flags stored in the flags field 214 described above as well as the lock field 206.

If at step 312 the newly added child event is a Phone Call event or a Reminder event, then a dialog box of the type shown in FIG. 4 is generated by the process editor. The programmer is prompted for a time of day to execute this event.

If at step 312 the newly added event is a Dialog event, then the process editor generates a dialog box of the type shown in FIG. 7. The programmer then enters a title and dialog text. Finally, the user selects an icon to be displayed along with the message contained in the dialog box. The programmer also selects a command button option. If a Stop event has been selected, then the process editor generates a dialog box of the type shown in FIG. 6. The programmer thereafter selects one of the stop options. These options have been described above in conjunction with FIG. 2.

If the selected event is a Question event, then the process editor generates a question dialog box of the type shown in FIG. 8*a*. The programmer is prompted to enter a question that will be presented to a user when this event is executed by the process manager. The corresponding Answer dialog box illustrated in FIG. 8b is generated when a programmer drops a child event upon the question event (see step 316 below).

If the selected event is a Goto event, then the process editor does not generate a dialog box. Instead, the programmer is prompted to click on a destination event to which the process execution is to jump. After a programmer selects the destination event, the process editor inserts a "comefrom" icon such as the comefrom icon 96 in FIG. 9.

After defining the event during step 312, control passes to step 314. Some event types affect the menus of the children events. Therefore, if at step 314 it is determined that the parent event of a newly added child event is a conditional branching event such as an ESP event or a question event, then control passes to step 316 wherein a dialog box is generated to prompt the programmer to enter the condition under which control will pass from the parent to the child event. If the parent event is an ESP event, then the process editor generates a dialog box of the type shown in FIG. 5. Thereafter, the programmer adds a criteria under which control will pass to the child event. If the parent event is a question event, then the process manager editor generates a dialog box of the type shown in FIG. 8b. The user is then prompted to enter an answer that will cause control to pass from the Question event to the child event. Control then passes to step 318. At step 314, if the parent event is not a conditional branching event, then control passes to step 318.

At step 318, if the newly added child event is a scheduled event, then control passes to step 320 wherein the process editor generates a dialog box prompting the programmer to enter a lead time. After the programmer enters a lead time, control passes to step 322. At step 318, if the parent event is not a scheduled event, then control passes directly to step 322.

At step 322, the programmer optionally adds a label to the icon on the display screen corresponding to the newly added event. This is accomplished by the programmer clicking upon the label region of the icon corresponding to the new event and then typing in the desired text.

Control then passes to step 324 wherein the programmer may optionally set a flag which indicates whether or not the newly added event will be a fall-through event. If the event is a fall-through event, then the process manager will not wait for the completion of the event before going on to the newly added event's child event during execution of the graphically depicted communication process. Control then passes to the Wait step 304.

If at step 306 the programmer has not selected an event from the task pallet 4, then control passes directly to step 326. At step 326, the process editor determines whether the user has selected the Test Process button 114 on the tool bar 6. If the user has selected the test process button 114, then control passes to step 328 where the process editor examines the currently loaded process and informs the programmer of any errors and warns the user of incomplete information for any event. For example, the process editor will indicate the events of the currently loaded graphically depicted communication process having errors as well as provide a short description of the errors. Control then passes to the Wait step 304.

If the test process button 114 is not selected by the programmer, then control passes directly from step 326 to step 330. At step 330, the process editor determines whether the programmer has selected the "Close" option on the file menu. At step 330, if the programmer has selected the Close option, then control passes to the End step. If, however, the Close option has not been selected, then control passes to step 332 wherein the process editor may perform one of the wellknown procedures associated with one of the items selected from the tool bar 6 of the graphical user interface. Since these procedures are well known to those skilled in the art, they will not be described. Also, if the user has selected one of the previously placed events or time lapses on the graphically depicted communication process, then an appropriate dialog box is generated during step 332 to enable the programmer to edit the previously designated event or time lapse. Control then passes to the wait step 304.

It is noted in closing with respect to the description of FIG. 15 that the above steps are in most cases independent of previously executed steps. It will be appreciated by those skilled in the art that the various selection tests can be rearranged without effecting the resulting operation of the process editor. Such modification would fall within the contemplated scope of the present invention.

Having described how to create a process, attention is now directed to the running of processes in conjunction with one or more selected prospect records. A prospect is a specific type of business contact. However, the present invention can be applied to virtually any business contact, including customers, suppliers and co-workers.

Turning now to FIG. 16, a Run Process dialog box is illustrated which is generated by the process manager when a user selects a run process option. The Run Process dialog box of FIG. 16 includes two fields for designating a particular communication process to be run by the process manager. The Process Family field displays a set of process directories. The Process Name field identifies a specific communication process contained in the selected process family.

After a user selects the specific communication process which is to be run, the user selects a prospect file to which the process manager will refer when the selected process is executed. Alternatively, the user may designate a set of prospects by means of the "Find In Database" command. The Find In Database command enables a user to find and designate a set of prospect records for which the selected communication process will be run. After the user selects "Go", the selected communication process is executed for each of the designated prospect records.

The next option designated by the user in the run process dialog box is the Process Information field. The Auto-Accept option, when selected, causes the process manager to automatically execute the listed events without requesting confirmation by the user. If the Start Process Today option is selected, then the process manager will use the current date as a reference for generating all due dates specified within the communication process. After a user has selected the communication process and the target prospect, and the user has designated the manner in which the information is to be processed, the user selects the Go button in order to commence processing.

The Run Process dialog box illustrated in FIG. 16 also includes a scheduled event list. The information for this list is generated as a result of the running of the selected communication process upon the selected prospect database entry. The scheduled event list has an event field, a run date field, and a summary field. In the example of FIG. 16, the first two events are letters, and the last event is a phone call. The run process dialog box also includes a Delete button for deleting entries on the scheduled event list and an edit button for editing an event on the schedule event list. A Delay button allows the user to change the scheduled run date of a scheduled event or series of events.

Figure 17:
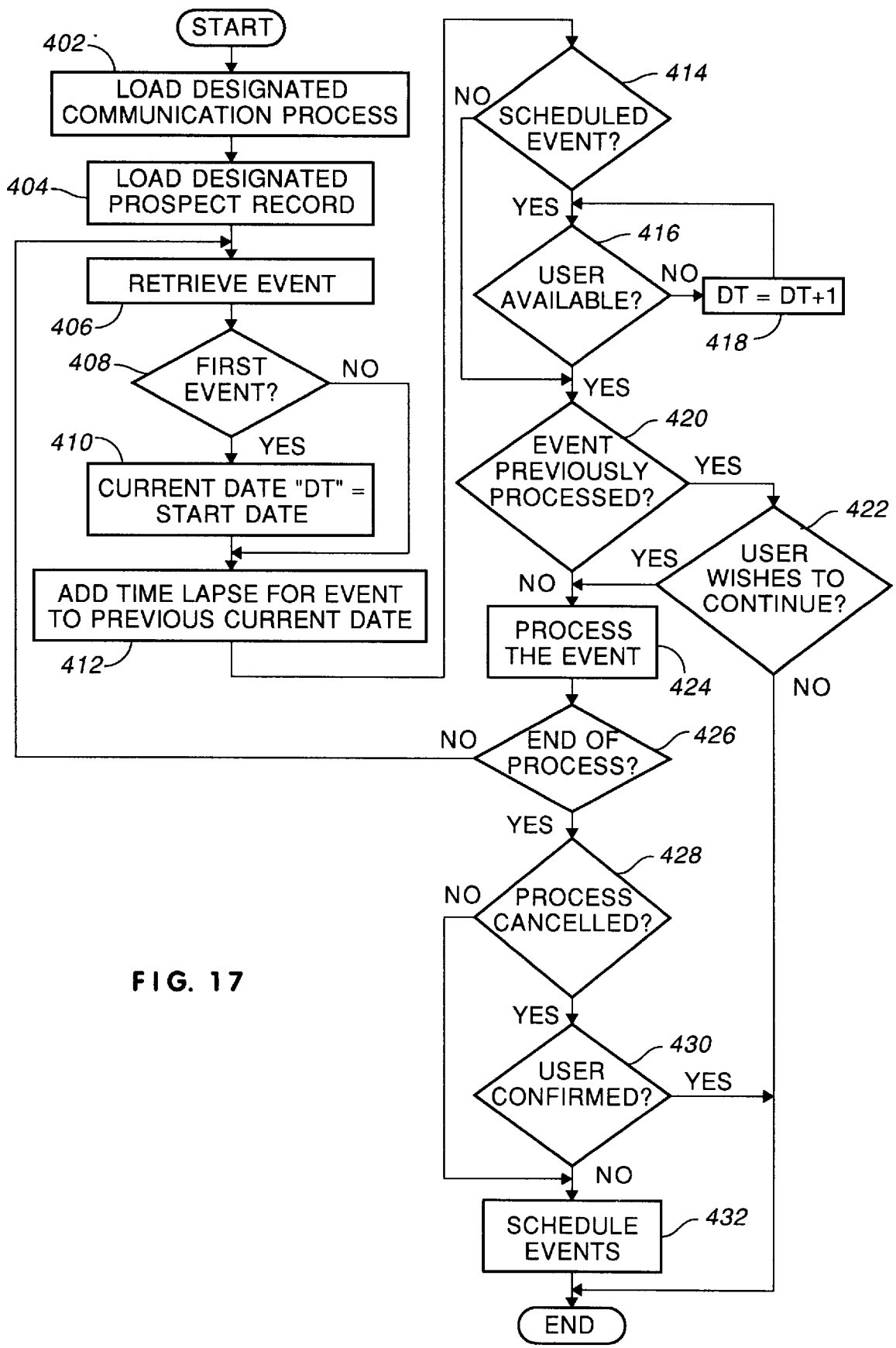
FIG. 17 is a flowchart summarizing the steps executed by a process manager when a graphically depicted communication process is executed in immediate mode.

Turning now to FIG. 17, the steps are summarized for executing a communication process on a designated target prospect in the immediate mode where the process manager schedules events immediately rather than waiting for the actual time to arrive before processing an event in a communication process (real time mode). The steps for executing a communication process in real time mode is described in FIG. 18.

In the immediate execution mode, the process manager operates in an accelerated mode and generates any required documents and a schedule of events resulting from the execution of the process events in conjunction with a selected prospect record. When a user selects the "Go" button on the Run Process dialog box, control passes from the Start to step 402 wherein the process manager loads a designated communication process and initializes variables. Control then passes to step 404 and the process manager loads a user designated prospect record. Control then passes to step 406 which marks the beginning of the execution loop for processing the events within the designated communication process.

At step 406, the process manager retrieves an event from the designated communication process according to the present location of the process manager within the linked events comprising the selected communication process. Control then passes to step 408.

At step 408, the process manager determines whether the retrieved event is the first event of the communication process. If the retrieved event is the first event, then control passes to step 410 wherein the process manager initializes the "current date" variable "DT" equal to the start date of the designated communication process. The start date is supplied by a user via the Run Process dialog box and passed to the program manager when the user selects the Go button to commence execution of the communication process. The current date variable DT holds the effective current date of the process for purposes of scheduling events. Control then passes to step 412. At step 408, if the retrieved event is not the first event of the designated communication process, then control passes directly to step 412.

At step 412, the process manager updates the current date variable DT by adding a time lapse value retrieved from the Time field 154 of the retrieved event to the previous value of the current date variable DT. Control then passes to step 414.

At step 414, the process manager reads a flag stored in the type sub-field of the Event Field 176 from the event data structure (shown in FIG. 11) for the current event in order to determine whether the retrieved event is a scheduled event. If the retrieved event is a scheduled event, then control passes to step 416. At step 416, the process manager determines whether or not the user is available to perform the scheduled event on the current date. If the user is not available on the current date, then control passes to step 418 and the process manager increments the current date (DT) by one day. Control then returns to step 416 and the test for availability is re-applied. At step 416, if the user is available on the current date, then control passes to step 420. At step 414, if the retrieved event is not a scheduled event, then control passes directly to step 420.

Because a Goto event is available to a programmer of a communication process, it is possible for the process programmer to design a communication process that will run in an infinite loop. Therefore, at step 420, the process manager determines whether or not the retrieved event has been run before during the execution of the designated communication process. If the retrieved event has been run previously, then control passes to step 422 wherein the process manager warns the user that the communication process has looped back to a previously executed event. If after receiving the warning the user does not wish to continue, then control passes to the End step. If, however, the uses wishes to continue, then control passes from step 422 to step 424. At step 420, if the retrieved event has not been previously run during the execution of the designated communication process, then control passes directly to step 424.

At step 424, the process manager executes the retrieved event. Each of the various types of scheduled communication and control events has been discussed in detail above. Other scheduled communication and control events will be known to those skilled in the art. The scope of the present invention is intended to cover such additional events relating to communication processes that would fall within the spirit of the present invention. A communication process is therefore intended to cover a process of the type graphically depicted in FIG. 1 which sets forth a communication protocol between a business and its contacts. The scheduled events within the communication process comprise interpersonal communications. Such communications include phone calls, letters, facsimiles, and appointments. Other events will be known to those skilled in the art. After executing the retrieved event and storing any results in an event record of the type shown in FIG. 18 (described below), control passes to step 426.

At step 426, the process manager determines whether an end has been reached to the designated communication process. If the end of the designated communication process has not been reached, then control returns to step 406 and a next event is retrieved from the designated communication process. If, however, at step 426 the process manager has reached the end of the designated communication process, then control passes to step 428.

There are a number of ways in which a process can be ended. One way in which a process may end is the process manager reaches the last node on a given branch of a communication process. Another way that a process may be ended is the encountering of a Stop event in the designated communication process. As explained above, there are a number of ways in which a process can be stopped during a stop event. one of the options is to cancel the process. When a process is canceled, all records created by the execution of that process are not saved. On the other hand, when a process is merely stopped (rather than canceled), then all records produced up to that point will be saved in a set of records corresponding to the events executed before the process was stopped.

At step 428, if the process was ended because the process was canceled, then control passes to step 430 where the process manager asks the user a second time whether the user wishes to cancel the process thereby removing all traces of the canceled process. If the user answers in the affirmative, then control passes directly to the End step. If, however, at step 430 the user decides to override the cancellation of the process, then control passes to step 432. At step 428, if the process was not ended due to the cancelling of the process, then control passes directly to step 432.

At step 432, the process manager saves all of the records created during the execution of the designated communication process to an event file which is used to create a list of all scheduled events. This list of scheduled events is presented to the user in the lower portion of the Run Process dialog box shown in FIG. 16. Control then passes to the End step.

Communication processes can be run in either an immediate processing mode or a real time mode. Turning now to FIG. 18, a flow chart is provided which shows the steps for executing a communication process in the real time mode. It is noted that the real time process manager is capable of processing a plurality of concurrent communication processes. Therefore, the steps summarized in FIG. 18 can be applied to a plurality of currently running communication processes loaded in a process table (PT) of the real time process manager. It is noted, however, that only a single wait is applied per status check of all of the concurrent communication processes.

From the Start, control passes to step 450 wherein the process manager loads the communication process into a process table (PT) of the process management system. The process table entry corresponding to the loaded communication process contains the following information: file information to identify the file to which this process belongs resides on a hard drive; current event information, including an event ID indicating the current location of the process manager in the communication process as well as the event type of the current event; and wait status information indicating why the process is halted (i.e. the current event is not being executed by the process manager). The reasons for a process being halted include a wait of a certain number of days, a wait until a certain date, a wait for a specified trigger event to occur, the user has halted the process, a device (such as a printer or modem) is not currently available to complete the specified task associated with the current event, or the process file cannot be found to get a next event. The process table entry for a loaded communication process also includes next event information. The next event information identifies the next event to be processed by the process manager as well as information associated with the next event to be processed after the current event. If the current event is a conditional branching control event such as an ESP event or a Question event, then the process manager attempts to process the condition immediately if the answer can be obtained by looking at the prospect record.

After loading the process into the process table, control passes to step 452 and the process manager examines the process table entry for the loaded process to determine the status of the current event. Control then passes to step 454.

At step 454, the process management system determines whether the required wait for executing the current event has been completed. If the wait period is completed, then control passes to step 456 and the current event is executed in a manner similar to step 424 of FIG. 17. It is noted, however, that distinctions may be made between the execution of an event in real time as opposed to immediate processing. It is therefore contemplated that scheduled events will be handled slightly different in the real time mode in comparison to the immediate processing mode. These differences arise from the fact that in the immediate processing mode, the events are executed prior to the actual date in which the scheduled event is to occur. On the other hand, in the real processing mode, the event is not executed until the actual scheduled date. It is also noted that events executed in the real processing mode can be forced to operate like an immediately processed event by setting a Force_Scheduled flag in the event. If the force scheduled flag is set, then the executed scheduled event is placed in the user appointment book database just like an immediately processed event even though the event was processed in real-time mode. After executing the event, control passes to step 458.

At step 458, the process management system determines whether or not there are any more events to be processed for the loaded communication process. If more events exist in the loaded process, then control passes to step 460 and the next event is selected. Thereafter, control passes back to step 452. At step 458, if no more events are left to be processed in the loaded communication process, then control passes to step 462 where a wait period is executed before testing for the execution of a next event in the loaded communication process. The wait period is user definable to be of a specified number of minutes, days, hours, or each time the computer is started. The last option is useful if events are scheduled daily and the user restarts the computer every day. After executing the wait period, control passes from step 462 to step 464.

At step 464, the process management system determines whether the real time process manager has been shut down. If the real time process manager has not been shut down, then control passes to step 466 wherein the process manager updates and refreshes the process tables to reflect any change in status of any events or conditions. Control then returns to step 452. If at step 464 the process manager determines that the real time process manager has been shut down, then control passes to the End.

Turning now to FIG. 19, the fields are described for the data structure created by the execution of an event in either real time or immediate mode. This data structure, in turn, is used to execute functions associated with the event. The first field of the data structure created by the execution of a scheduled event, is a prospect ID field 500. The value stored in the prospect ID field 500 is used to identify a prospect in a prospect table (not shown). A prospect name field 502 identifies an actual name for the prospect. Next, an event type field 504 identifies the type of the event which caused the creation of the event data structure. Fields 500, 502 and 504 facilitate identifying certain event records based upon a search of these fields of the output records for an executed process.

A run time field 506 specifies a date and time in which an event will be executed. An example where the run time field is loaded with a value is an appointment event. A run date field 508 specifies a date or time in which an event is to be run. The run date field 508 utilized in the case of scheduled events such as the generation of follow-up letters to prospects. A run duration field 510 specifies the length of an event if the event is an appointment. Otherwise, the run duration specifies lead time for the event. A file name field 512 specifies a file name containing a letter process or form associated with the output record for the event. A completed field 514 specifies whether the process manager has executed the event. A summary field 516, a notes field 518, contain text corresponding to fields 182 and 184 of the event data structure. A process type field 520 corresponds to the text stored in the family field 204 of the entry field 178 of an event.

A process type field 520 specifies a category name for a sub-process event. A process name field 522 specifies a name for the process specified by the sub-process event. A process file field 524 specifies the name of a file stored on disk containing the process specified by the sub-process event. A process node field 526 comprises a number uniquely identifying this sub-process event. A user field 528 identifies the user that caused the event to be executed, thereby creating the event record. A resInfo field 530 is a miscellaneous field containing data associated with subsequently batted custom events.

While a preferred embodiment of the present invention has been described, the invention is not limited to this embodiment, rather, it is intended to cover the all alterations and modifications which fall within the scope of the invention described in the claims appended herein below. For example, the process management system may be implemented in both a standalone personal computer environment or alternatively in a local area network.

The types of personal communication events presented in the event pallet 4 are intended to be illustrative. In fact, the preferred embodiment includes means for storing the event definitions associated with the event pallet 4 in a directory from which the process editor builds the event pallet 4. Thus, a user may define additional control and scheduled personal communication events and place the defined events in the directory in order to augment the set of events displayed in the event pallet 4. The above alterations to the preferred embodiment are not fully inclusive. Additional modifications to the described preferred embodiment which do not depart from the spirit and scope of the present invention will be apparent to those skilled in the art.

What is claimed is:

1. A system for producing a program for creating and maintaining business contacts by executing graphically represented communication processes, said system comprising:

at least one communication process defined as a set of graphically displayed events and graphically displayed relation indicators extending between events, wherein each event is either a scheduled event or a control event; and a process manager for executing said program as a series of computer implemented tasks to execute said graphically represented communication process in accordance with the defined events and the path defined by the relation indicators between events.

2. The system of claim 1 wherein a scheduled event is the production of a predefined communication.

3. The system of claim 1 wherein a scheduled event includes a prompt for intervention by a user.

4. The system of claim 1 wherein a control event includes a prompt for entry of information by a user.

5. The system as set forth in claim 2 wherein the predefined communication is a form letter.

6. The system as set forth in claim 2 wherein the predefined communication is a telephone call.

7. The system as set forth in claim 1 and further including at least one database of business contacts, wherein a control event includes access to and evaluation of information from said at least one database.

8. The system as set forth in claim 1 wherein said relation indicators impose a predetermined delay between two events.

9. A method for producing a program for scheduling and maintaining business contacts on a computer, said method comprising the steps of:

displaying a communication process as a set of graphically represented scheduled events and control events upon a graphical user interface;

defining relationships between the scheduled events and the control events with graphical relation indicators, wherein the control events direct the execution of the scheduled events; and executing said program as a series of computer implemented tasks to execute.

10. The method as set forth in claim 9 wherein said displaying step includes the steps of:

selecting a first event from a palette;

selecting a second event from a palette;

and said defining step includes the step of:

connecting the second event to the first event with a graphical relation indicator.

11. The method as set forth in claim 9 wherein said displaying step includes the steps of:

selecting a first event from a palette, wherein the first event is a control event;

selecting a second event from a palette;

selecting a third event from a palette;

and said defining step includes the steps of:

connecting the second event to the first event with a first graphical relation indicator and connecting the third event to the first event with a second graphical relation indicator.

12. The method of claim 9 wherein a scheduled event includes the step of:

delivering communications without user intervention.

13. The method of claim 9 wherein a scheduled event includes the step of prompting a user for intervention.

14. The method of claim 9 wherein a control event includes the steps of accessing at least one database of business contacts and evaluating information from the database.

15. The method of claim 9 wherein a control event includes the step of prompting a user to enter information.

* * * * *